United States Patent
Zhen et al.

(10) Patent No.: US 12,105,245 B1
(45) Date of Patent: Oct. 1, 2024

(54) GROUND RECEIVING FRONT-END COMPENSATION SYSTEM FOR INTELLIGENT GUIDE DRILLING BOREHOLE-GROUND ELECTROMAGNETIC TRANSMISSION

(71) Applicant: Institute of Geology and Geophysics, Chinese Academy of Sciences, Beijing (CN)

(72) Inventors: Qihui Zhen, Beijing (CN); Qingyun Di, Beijing (CN); Yuliang Wang, Beijing (CN); Quanmin Yang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/410,865

(22) Filed: Jan. 11, 2024

(30) Foreign Application Priority Data

Apr. 14, 2023 (CN) .......................... 202310401911.4

(51) Int. Cl.
*G01V 3/28* (2006.01)
*E21B 47/13* (2012.01)

(52) U.S. Cl.
CPC .................. *G01V 3/28* (2013.01); *E21B 47/13* (2020.05)

(58) Field of Classification Search
CPC .................................... G01V 3/28; E21B 47/13
See application file for complete search history.

(56) References Cited

U.S. PATENT DOCUMENTS

| 5,570,024 A | 10/1996 | Vail, III |
| 10,669,841 B1 * | 6/2020 | Erdos ..................... H04B 15/00 |

(Continued)

FOREIGN PATENT DOCUMENTS

| CN | 102841266 A | 12/2012 |
| CN | 203554347 U | 4/2014 |

(Continued)

OTHER PUBLICATIONS

Gaelle Jannin et al., "Deep electrode: A game-changing technology for electromagnetic (EM) telemetry," SEG International Exposition and 87th Annual Meeting, Sep. 2017, pp. 1,059-1,063.

(Continued)

*Primary Examiner* — Neel D Shah
*Assistant Examiner* — Adam S Clarke
(74) *Attorney, Agent, or Firm* — Pilloff Passino & Cosenza LLP; Rachel K. Pilloff; Sean A. Passino

(57) ABSTRACT

A ground receiving front-end compensation system for intelligent guide drilling borehole-ground electromagnetic transmission is provided, and includes a ground sensing module located below the underground wellhead, a ground system located between the underground wellhead and the measuring electrode, a measuring electrode and a compensation electrode; the ground system, the measuring electrode and the compensation electrode are located at the same side of the underground wellhead, a measuring electrode spacing (a first preset distance) is a distance from the underground wellhead to the measuring electrode; a compensation electrode spacing (a second preset distance) is a distance from the underground wellhead to the compensation electrode, the second preset distance is greater than the first preset distance; an induction signal of the ground sensing module enters the ground system, and the ground system outputs compensation current based on the induction signal, and (Continued)

compensates the measuring signal based on the compensation current.

5 Claims, 12 Drawing Sheets

(56) References Cited

U.S. PATENT DOCUMENTS

| | | | |
|---|---|---|---|
| 2002/0043977 A1* | 4/2002 | Vail, III | G01V 3/24 |
| | | | 324/368 |
| 2017/0227667 A1 | 8/2017 | DePavia et al. | |
| 2017/0362932 A1 | 12/2017 | Gao et al. | |
| 2018/0081076 A1 | 3/2018 | Ahmadi Kalateh Ahmad et al. | |
| 2018/0135409 A1 | 5/2018 | Wilson et al. | |
| 2018/0291729 A1 | 10/2018 | Wilson et al. | |
| 2019/0353031 A1* | 11/2019 | Logan | H04L 1/0045 |

FOREIGN PATENT DOCUMENTS

| | | |
|---|---|---|
| CN | 106285649 A | 1/2017 |
| CN | 106842342 A | 6/2017 |
| CN | 107810308 A | 3/2018 |
| CN | 107849915 A | 3/2018 |
| CN | 108979961 A | 12/2018 |
| CN | 113406708 A | 9/2021 |
| CN | 217080441 U | 7/2022 |

OTHER PUBLICATIONS

Chun Shao et al., "Factors affecting received signal intensity of electromagnetic measurement-while-drilling during underground in-seam horizontal drilling," Journal of Natural Gas Science and Engineering, Jun. 2018, pp. 212-221, 56.

Zhenjun Ma et al., "Receiver noise correction in semi-airborne transient electromagnetic method with an electric source," Journal of Applied Geophysics, Feb. 4, 2023, 211, 104955.

Wang Jia, "Research and Application of Borehole-surface Electrical Resistivity Method of Monitoring Hydraulic Fracturing in the Oilfield," May 2013.

Zhu Rixiang et al., "Research and Progress of Intelligent Drilling Technology System and related theories," Chinese Journal of Geophysics, Jan. 2023, vol. 66, No. 1.

Pengfei Liang et al., "The distribution of currents on a drill rod in a layered medium," SEG International Exposition and 89th Annual Meeting, Sep. 2019, pp. 920-923.

First Office Action for China Application No. 202310401911.4, mailed Oct. 17, 2023.

Notification to Grant Patent for China Application No. 202310401911.4, mailed Jan. 19, 2024.

First Search Report for China Application No. 202310401911.4, dated Oct. 13, 2023.

Supplementary Search Report for China Application No. 202310401911.4, dated Jan. 8, 2024.

* cited by examiner

GROUND RECEIVING FRONT-END COMPENSATION SYSTEM FOR INTELLIGENT GUIDE DRILLING BOREHOLE-GROUND ELECTROMAGNETIC TRANSMISSION

CROSS-REFERENCE TO RELATED APPLICATIONS

This disclosure claims priority to Chinese Patent Application No. 202310401911.4, filed on Apr. 14, 2023, the contents of which are hereby incorporated by reference.

TECHNICAL FIELD

The disclosure belongs to a technical field of petroleum drilling, and in particular to a ground receiving front-end compensation system for intelligent guide drilling borehole-ground electromagnetic transmission.

BACKGROUND

Borehole-ground transmission, also known as MWD (measurement while drilling), realizes uploading of downhole data and downloading of ground drilling commands, and is very important in intelligent guide drilling system. According to the signal transmission mode, MWD may be divided into cable MWD, center type cable MWD, acoustic wave MWD, mud pulse MWD and electromagnetic measurement while drilling (EM-MWD), where the cable MWD and the center type cable MWD are wired MWD, and the acoustic wave MWD, the mud pulse MWD and EM-MWD are wireless MWD. Wired MWD affects the tripping efficiency of drill pipes and is easy to wear and damage, so the wired MWD is not suitable for drilling engineering. The acoustic wave method uses acoustic waves propagating along the drill pipes to transmit signals, and is free from influences of drilling fluid and formation, but acoustic waves attenuate quickly and the transmission distance is limited, so multiple repeaters are required. Therefore, the acoustic wave method is not suitable for deep wells. The mud wave uses mud pressure waves to transmit signals, this technology is relatively mature and widely used in drilling field, but may not be effectively used in compressed drilling media such as air and foam, and may not work normally in lost formation drilling. EM-MWD uses low-frequency electromagnetic signals to complete signal transmission through the drill pipes and strata, and is not affected by drilling media. EM-MWD is suitable for various drilling operations such as conventional drilling, lost well condition and gas drilling. Compared with mud pulse, EM-MWD has a simple structure and no moving parts, and has a broader application prospect.

The United States is a leader in EM-MWD technology, and there are mainly Scientific Drilling, Schlumberger, Halliburton, Weatherford, NOV, APS and other oil companies engage in the research and development of this technology. In addition, Russia, Canada, Britain and Japan have successively produced commercial products. Institutions researching on EM-MWD in China include Petroleum Exploration and Development Research Institute of China Petroleum&Chemical Corporation, Sinopec Research Institute of Petroleum Engineering, PetroChina Drilling Engineering Technology Research Institute, PetroChina Chuanqing Drilling and Production Institute, China Electronics Technology Corporation No. 22 Research Institute, University of Electronic Science and Technology of China, Xi'an Shiyou University and China University of Geosciences (Beijing), etc.

Scholars at home and abroad have done a lot of research on signal uploading (borehole to ground). The way of signal uploading (borehole to ground) is basically to use the wellhead as one electrode, and bury another electrode about 50 meters away from the wellhead, and measure the signal by measuring the voltage between the two electrodes. As shown in FIG. 1.

This kind of signal received through the ground electrode is very vulnerable to the interference of ground noise. Because signals transmitted from the deep borehole are extremely weak, and the ground power frequency interference and other human interference are large, the measurable signal-to-noise ratio is extremely low.

SUMMARY

In order to solve the above technical problems, a ground receiving front-end compensation system for intelligent guide drilling borehole-ground electromagnetic transmission provided by the disclosure may effectively provide downhole uploaded signals under a condition of avoiding strong ground interference.

In order to achieve the above purpose, the disclosure provides a ground receiving front-end compensation system for intelligent guide drilling borehole-ground electromagnetic transmission, including a ground sensing module, a ground system, a measuring electrode and a compensation electrode;

the ground system, the measuring electrode and the compensation electrode are all located at a same side of an underground wellhead, a measuring electrode spacing is a distance from the underground wellhead to the measuring electrode, that is, a first preset distance; and a compensation electrode spacing is a distance from the underground wellhead to the compensation electrode, that is, a second preset distance, and the second preset distance is greater than the first preset distance, and the ground system is located between the underground wellhead and the measuring electrode;

the ground sensing module is located below the underground wellhead;

the ground system is used for measuring a voltage between the underground wellhead and the measuring electrode to obtain a measuring signal; an induction signal of the ground sensing module enters the ground system, and the ground system outputs a compensation signal based on the induction signal, and compensates the measuring signal based on the compensation signal.

Optionally, the ground system includes a receiving module and a compensation module;

the receiving module is respectively connected with the underground wellhead and the measuring electrode; the compensation module is respectively connected with the underground wellhead, the compensation electrode and the ground sensing module;

the receiving module is used for measuring the voltage between the underground wellhead and the measuring electrode to obtain the measuring signal; and the compensation module is used for compensating the measuring signal.

Optionally, the ground sensing module includes a casing nipple and a front-end circuit;

an outer layer of the casing nipple is coated with an insulating layer collar, and a conductive collar is embedded on the insulating layer collar; and the front-end circuit is electrically connected with the casing nipple.

Optionally, the front-end circuit includes a first operational amplifier, a second operational amplifier, a third operational amplifier, a resistor R, a capacitor C, a resistor $R_b$, a capacitor $C_f$ and a resistor $R_f$;

a negative polarity end of the first operational amplifier is connected with the casing nipple and is connected with an output end of the first operational amplifier through the resistor R;

the output end of the first operational amplifier is connected with a positive polarity end of the second operational amplifier, and is connected with an output end of the second operational amplifier through the capacitor C;

the output end of the second operational amplifier is connected with the conductive collar and is connected with a negative polarity end of the third operational amplifier through the resistor $R_b$;

the resistor $R_f$ is connected in parallel with the capacitor $C_f$, after parallel connection, one end of the resistor $R_f$ is connected to the negative polarity end of the third operational amplifier, and an other end of the resistor $R_f$ is connected to an output end of the third operational amplifier and connected to a positive polarity end of the first operational amplifier;

a negative polarity end of the second operational amplifier and the positive polarity end of the third operational amplifier are both connected to a signal reference site;

an output of the second operational amplifier is used as an output of the ground sensing module.

Optionally, the receiving module includes a preamplifier, a data collector and a memory;

the preamplifier is used for amplifying the measuring signal;

the data collector collects the measuring signal; and the memory stores collected data.

Optionally, the compensation module uses a signal of the ground sensing module as an error signal, and then sends a current to the compensation electrode to force the output signal of the ground sensing module to be minimum, so as to compensate a measuring interference signal.

Optionally, the compensation module includes a preamplifier, a PI compensator and a high-power current signal source;

the preamplifier is used for amplifying the ground sensing signal;

the PI compensator is used for obtaining a compensation current signal; and the high-power current signal source is used for outputting a compensation current.

Compared with the prior art, the disclosure has following advantages and technical effects. The disclosure may effectively provide downhole uploaded signals under the condition of avoiding strong ground interference; under the condition of large interference signal on the ground, the disclosure may pick up downhole weak and small signals. Because the frequency band of the interference signal overlaps with the frequency band of small downhole signal, the situation that conventional technology may not pick up the signal with a signal-to-noise ratio below −60 dB is overcome.

BRIEF DESCRIPTION OF THE DRAWINGS

The accompanying drawings constitute a part of this application, and are used to provide a further understanding of the disclosure. The illustrative embodiments of the disclosure and the descriptions are used to explain the disclosure, and do not constitute an improper limitation of the disclosure. In the attached drawings.

DETAILED DESCRIPTION OF THE EMBODIMENTS

Figure 1:
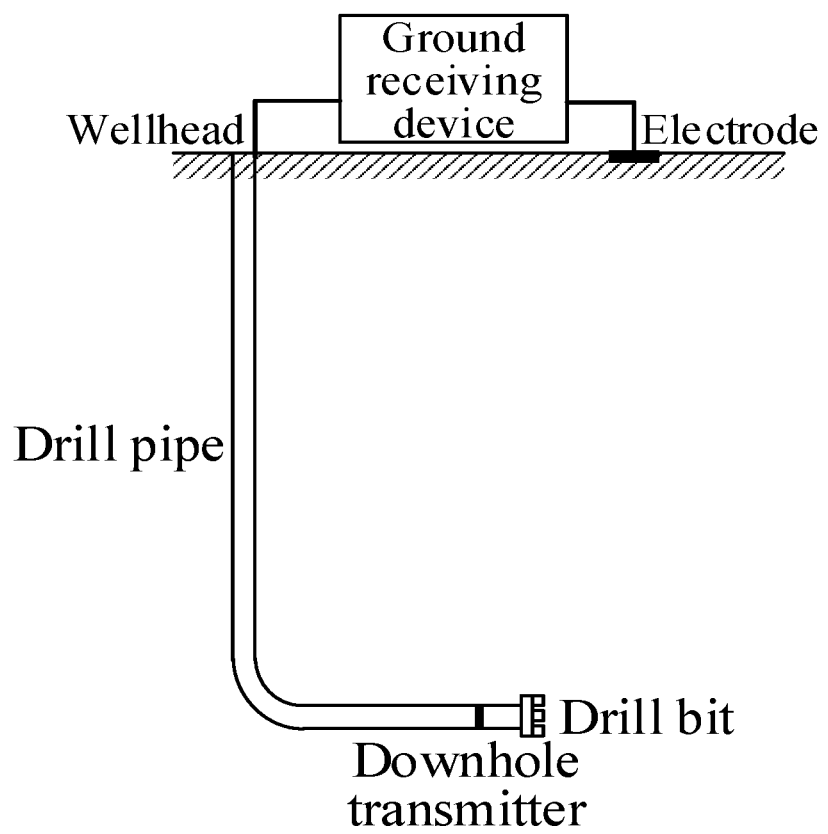
FIG. 1 is a schematic diagram of conventional downhole EM-MWD signal excitation mode.

It should be noted that the embodiments in the disclosure and the features in the embodiments may be combined with each other without conflict. The present disclosure is described in detail with reference to the attached drawings and embodiments.

It should be noted that the steps shown in the flowchart of the accompanying drawings may be executed in a computer system such as a set of computer-executable instructions, and although the logical order is shown in the flowchart, in some cases, the steps shown or described may be executed in a different order from here.

The disclosure provides a ground receiving front-end compensation system for intelligent guide drilling borehole-ground electromagnetic transmission, including a ground sensing module, a ground system, a measuring electrode and a compensation electrode;

the ground system, the measuring electrode and the compensation electrode are all located at a same side of an underground wellhead, a measuring electrode spacing is a distance from the underground wellhead to the measuring electrode, that is, a first preset distance; and a compensation electrode spacing is a distance from the underground wellhead to the compensation electrode, that is, a second preset distance, and the second preset distance is greater than the first preset distance, and the ground system is located between the underground wellhead and the measuring electrode;

the ground sensing module is located below the underground wellhead;

the ground system is used for measuring a voltage between the underground wellhead and the measuring electrode to obtain a measuring signal; an induction signal of the ground sensing module enters the ground system, and the ground system outputs a compensation signal based on the induction signal, and compensates the measuring signal based on the compensation signal.

Further, the ground system includes a receiving module and a compensation module;

the receiving module is respectively connected with the underground wellhead and the measuring electrode, and the measuring electrode is 20 m-50 m away from the wellhead; the compensation module is respectively connected with the underground wellhead, the compensation electrode and the ground sensing module, and the compensation electrode is 2 m-3 m away from the measuring electrode; the measuring electrode and the compensation electrode are surface electrodes made by laying 1 m×30 cm copper foil on the soil soaked in salt water and then stirred into paste, and burying the 1 m×30 cm copper foil with dry soil, the buried depth is about 20 cm and the ideal grounding resistance is less than 50Ω.

The receiving module is used for measuring the voltage between the underground wellhead and the measuring electrode to obtain the measuring signal; the receiving module consists of a preamplifier, a data collector and a memory. The preamplifier is connected to the data collector, and the data collected by the data collector is sent to the memory for storage. The preamplifier is used for amplifying the measuring signal, the data collector collects the measuring signal, and the memory stores collected data.

The compensation module is used for compensating the measuring signal. The compensation module uses the signal of the ground sensing module as an error signal, and then sends current to the compensation electrode to force the output signal of the ground sensing module to be minimum, so as to compensate a measuring interference signal. The compensation module includes a preamplifier, a PI compensator and a high-power current signal source. The preamplifier outputs a signal and sends the signal to the PI compensator, and an output of the PI compensator is used as a control signal to control an output of the high-power current signal source to form a compensation current. The preamplifier is used for amplifying the ground sensing signal, the PI compensator is used for obtaining a compensation current signal, and the high-power current signal source is used for outputting the compensation current.

Further, the ground sensing module includes a casing nipple and a front-end circuit;

the outer layer of the casing nipple is coated with an insulating layer collar, and a conductive collar is embedded on the insulating layer collar, where the insulating layer collar is made of insulating ceramic materials.

The front-end circuit is electrically connected with the casing nipple.

Further, the front-end circuit includes a first operational amplifier, a second operational amplifier, a third operational amplifier, a resistor R, a capacitor C, a resistor $R_b$, a capacitor $C_f$ and a resistor $R_f$;

a negative polarity end of the first operational amplifier is connected with the casing nipple and is connected with an output end of the first operational amplifier through the resistor R;

the output end of the first operational amplifier is connected with a positive polarity end of the second operational amplifier, and is connected with an output end of the second operational amplifier through the capacitor C;

the output end of the second operational amplifier is connected with the conductive collar and is connected with a negative polarity end of the third operational amplifier through the resistor $R_b$;

the resistor $R_f$ is connected in parallel with the capacitor $C_f$, after parallel connection, one end of the resistor $R_f$ is connected to the negative polarity end of the third operational amplifier, and an other end of the resistor $R_f$ is connected to an output end of the third operational amplifier and connected to a positive polarity end of the first operational amplifier;

a negative polarity end of the second operational amplifier and the positive polarity end of the third operational amplifier are both connected to a signal reference site;

an output of the second operational amplifier is used as an output of the ground sensing module.

Figure 2:
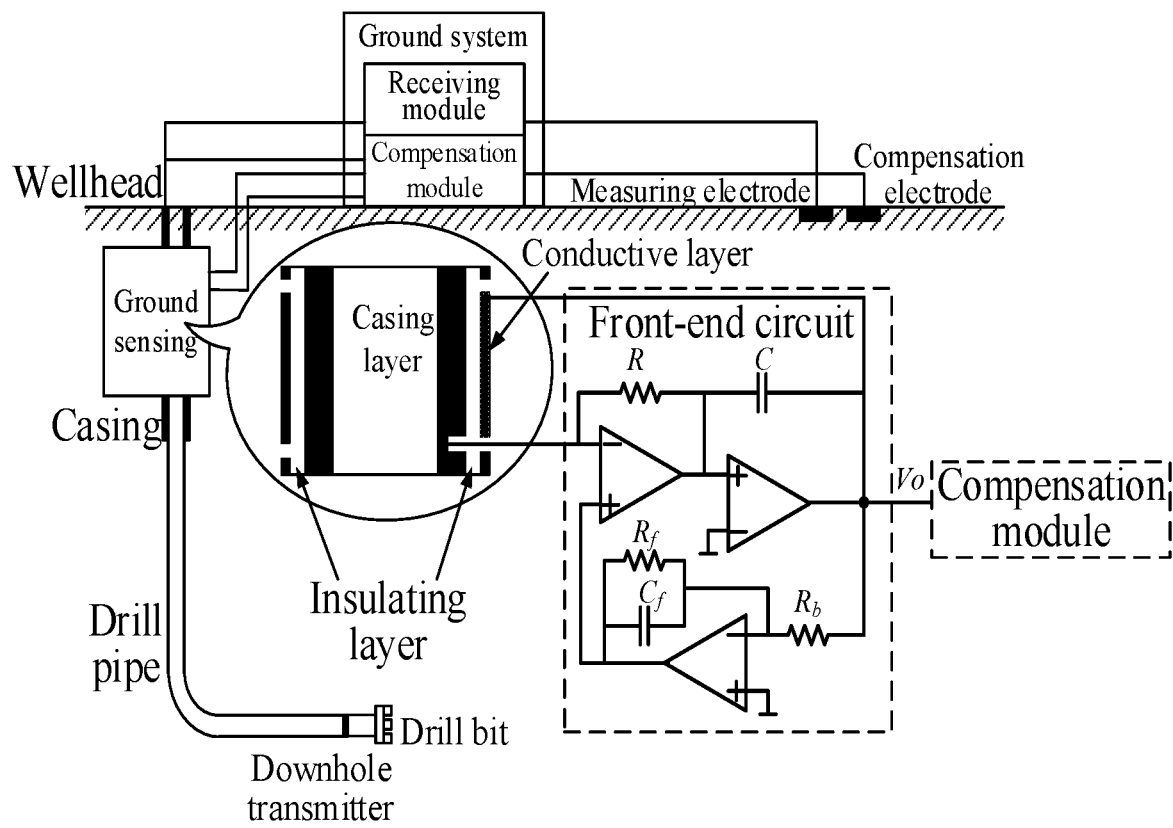
FIG. 2 is a schematic diagram of a ground receiving front-end sensing structure according to an embodiment of the present disclosure.

This embodiment is based on an interference signal mainly distributed on the ground. If the interference signal may be extracted and then removed from the measured signal, a relatively clean and useful signal may be obtained, thus greatly improving the signal-to-noise ratio. Based on the idea, the disclosure technology as shown in FIG. 2 is designed.

The sensing system proposed in the embodiment includes a ground sensing module near the underground wellhead and a ground system, where the ground system consists of a compensation module and a measuring module. The signal of the ground sensing module installed at the underground wellhead enters the ground compensation module, and the compensation module outputs a compensation signal, one end of the compensation module is connected to the wellhead and the other end of the compensation module is connected to the compensation electrode. The ground receiving module inputs the measuring signal, one end of the ground receiving module is connected to the wellhead and the other end of the ground receiving module is connected to the measuring electrode. The measuring electrode is 20 m-50 m away from the wellhead, and the compensation electrode is 2 m-3 m away from the measuring electrode, that is, the distance from the compensation electrode to the wellhead is 2 m-3 m farther than the distance from the measuring electrode to the wellhead.

Where the ground sensing module is a section of a casing nipple not less than 1 meter, the outer layer of the casing nipple is coated with an insulating layer collar, and a conductive collar is added on the insulating layer collar, and insulating rings are added above and below the conductive collar, so that the conductive collar is not in an electrical connection with a casing. A wire pulled out of a casing layer is connected to the negative polarity end of the first operational amplifier A1 and is connected to the output end of the first operational amplifier A1 through the resistor R. The output end of the first operational amplifier A1 is connected to the output end of the second operational amplifier A2 and is connected to the output end of the second operational amplifier A2 through a capacitor C. The output end of the second operational amplifier A2 is connected to a conductive layer of the casing nipple, and is connected to the negative polarity end of the third operational amplifier A3 through the resistor $R_b$. After the resistor $R_f$ is connected in parallel with the capacitor $C_f$, one end of the resistor $R_f$ is connected to the negative polarity end of the third operational amplifier A3, and the other end of the resistor $R_f$ is connected to the output of the operational amplifier A3 and is connected to the positive polarity end of the first operational amplifier A1. The negative polarity end of the second operational amplifier A2 and the positive polarity end of the third operational amplifier A3 are connected to the signal reference site. The output of the second operational amplifier A2 is taken as the output of the whole sensing device.

The purpose of this embodiment is to effectively provide downhole uploaded signals under a condition of avoiding strong ground interference.

In order to prove the effectiveness of the technology, firstly, the voltage V1 between the wellhead and the measuring electrode of the ground power frequency interference and the induced voltage E1 of the ground sensing module near the underground wellhead are calculated; then, the voltage V2 between the wellhead and the measuring electrode of the excitation near the rotating head of the downhole and the induced voltage E2 of the ground sensing module near the underground wellhead are calculated; then, the voltage V3 between the wellhead and the measuring electrode of the excitation from the wellhead to the compensation electrode and the induced voltage E3 of the ground sensing module near the underground wellhead are calculated; the voltage obtained by the ground measuring module is V=V1+V2−V3, and the compensation module aims to make the induced voltage of the ground sensing module near the wellhead zero, V1 and V3 are as close as possible at this time, so as to realize that the voltage obtained by the ground measuring module contains more useful signals, that is, the signal-to-noise ratio is higher. Finally, the bandwidth characteristics of the front-end sensing circuit are calculated to ensure that the circuit bandwidth may effectively extract the interference signal.

Figure 3:
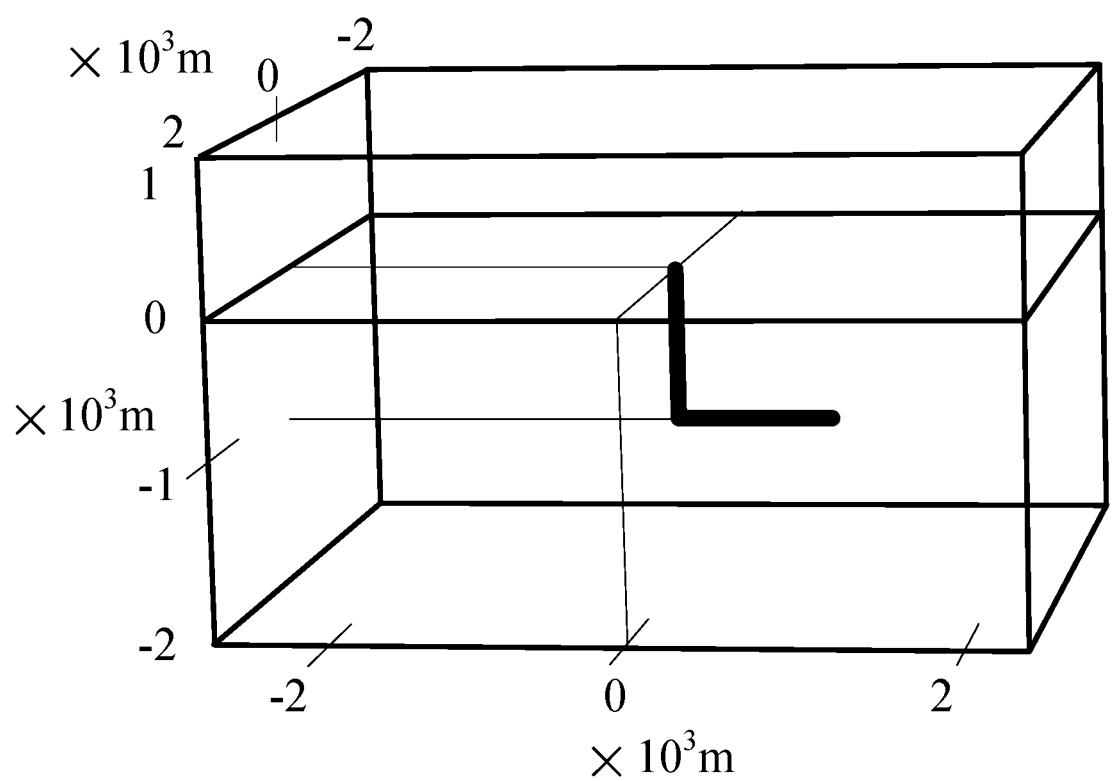
FIG. 3 is a schematic diagram of a calculation model design according to an embodiment of the present disclosure.
Figure 4:
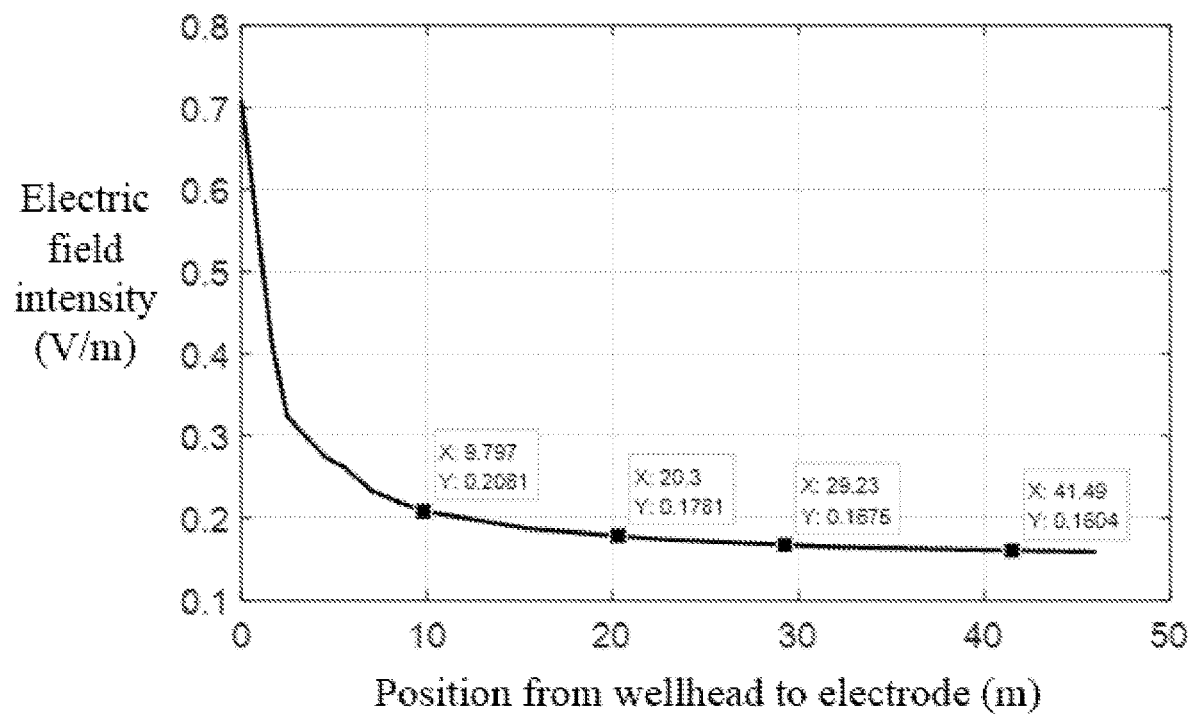
FIG. 4 is a schematic diagram of an electric field intensity distribution from an interference excitation wellhead to an electrode direction according to an embodiment of the present disclosure.

The designed simulation calculation model is 5 km long, 5 km wide, 1 km high in the air layer and 2 km deep in the stratum. The resistivity of the air is $3\times10^{13}$ Ω·m, the resistivity of the stratum is 100 Ω·m, the wellhead is at the origin coordinates (0,0,0), a vertical interval is 1 km deep and a horizontal interval is 1 km, as shown in FIG. 3:

step 1: adding a 1 A/m surface current along the drilling trajectory to the ground (the direction has a greatest influence on the downhole signal) with a frequency of 50 Hz. The calculated electric field intensity distribution along an electrode direction is shown in FIG. 4.

It may be seen that a maximum electric field intensity at the wellhead reaches 0.7 V/m, and the electric field intensity drops rapidly with the distance away from the wellhead. The electric field intensity at the distance of 10 m drops to 0.2V/m, and then slowly drops, and the electric field at the distance of 40 m basically remains at the level of 0.16V/m. At this time, the voltage between the wellhead and the electrode is the integral of the electric field intensity between the wellhead and the electrode:

$$V_1 = \int_0^{50} E \cdot x \, dx \tag{1}$$

After calculation, a ground interference voltage V1≈9.98 V.

Figure 5:
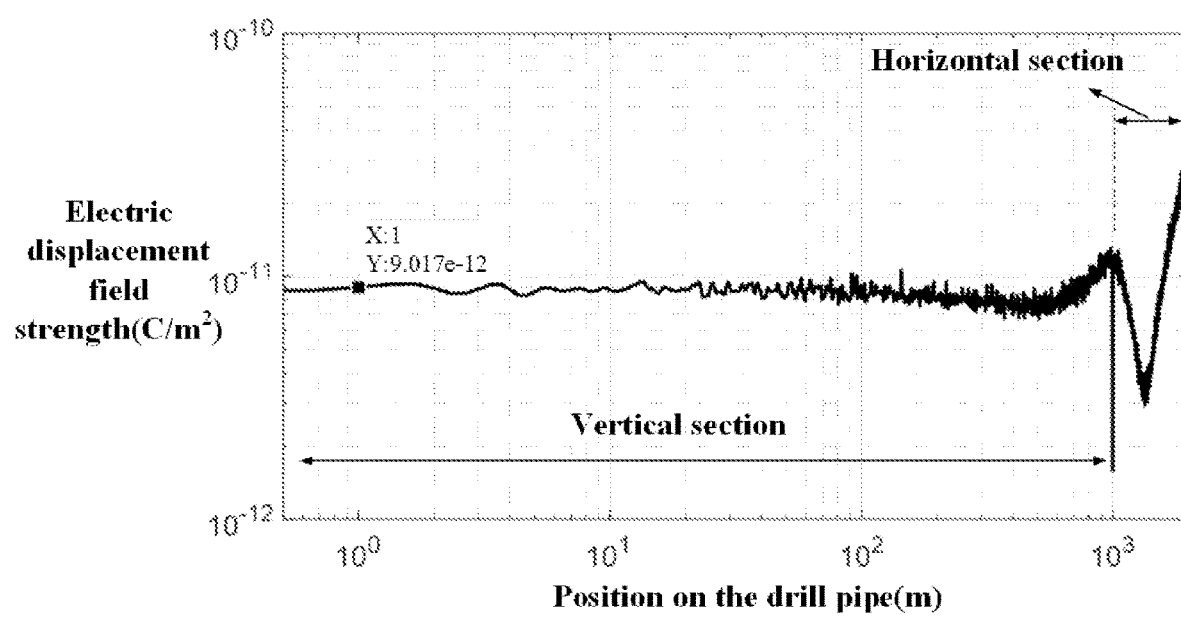
FIG. 5 is a schematic diagram of an electric displacement field distribution on an interference excitation drill pipe according to an embodiment of the present disclosure.

The calculated electric displacement field strength distribution along a drill pipe direction is shown in FIG. 5.

It may be seen that an interference signal of 50 Hz excited the electric displacement intensity of the charge distribution at the wellhead at $9\times10^{-12}$ C/m² on the underground drill pipe, so it is reasonable to take an interference electric displacement field strength of an underground sensing casing nipple as $9\times10^{-12}$ C/m².

Capacitance Voltage Induced by the Casing Nipple:

$$V = \frac{Q}{C_s} = \frac{D \cdot S}{C_s} \tag{2}$$

where Cs represents the equivalent capacitance formed between a bushing layer and the conductive layer; V represents a voltage formed between the casing layer and the conductive layer; D represents an electric displacement density from the casing layer to the conductive layer; and S represents a surface area of the conductive layer.

Ignoring a boundary effect of the electric field between the conductive layer and the casing, the capacitance is:

$$C_s = \frac{\varepsilon \cdot S}{d} \tag{3}$$

taking the sensing casing nipple as 1 m, the relative dielectric constant of the insulating layer is 3, a casing radius is 0.2 m, and a thickness of the insulating layer is 5 mm, the capacitance between the conductive layer and the casing is about 669 pF.

Bringing the electric displacement density on the wellhead drill pipe D=$9\times10^{-12}$ C/m², Cs-669 pF and S=0.126 m² in FIG. 5 into Formula (2), and the induced voltage E1 between the casing layer and the conductive layer of the interference source may be obtained: E1≈1.7 mV.

Figure 6:
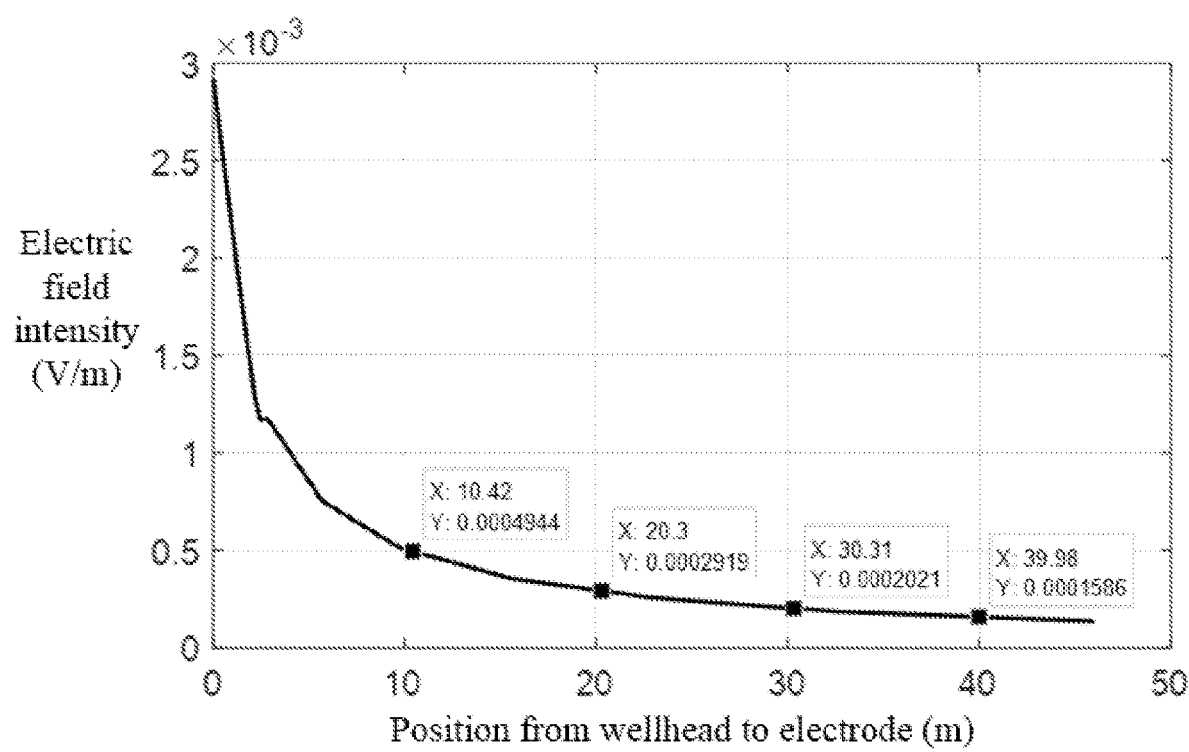
FIG. 6 is a schematic diagram of an electric field intensity distribution from a downhole excitation wellhead to an electrode direction according to an embodiment of the present disclosure.

Step 2, applying a dipole 9 A·m near the drill bit with a frequency of 10 Hz, and it is equivalent to the actual construction situation. The electric field intensity distribution along the electrode direction of downhole excitation is shown in FIG. 6.

It may be seen that the maximum electric field intensity at the wellhead is 3 mV/m, and the electric field intensity drops rapidly with the distance from the wellhead. The electric field intensity at the distance of 10 m drops to 0.5 mV/m, and then slowly drops, and the electric field at the distance of 40 m basically keeps at the level of 0.15 mV/m. At this time, the voltage between the wellhead and the electrode excited by downhole excitation is the integral of the electric field intensity between the wellhead and the electrode, and V2≈21.8 mV is calculated.

Figure 7:
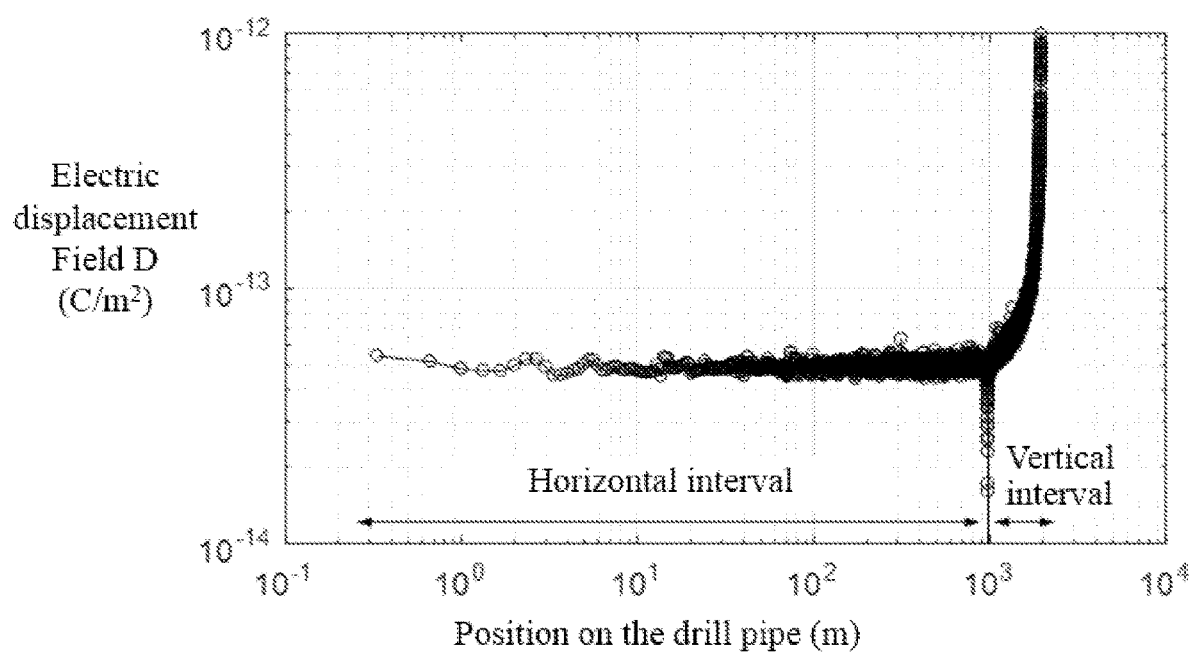
FIG. 7 is a schematic diagram of an electric displacement field distribution on a downhole excitation drill pipe according to an embodiment of the present disclosure.

The distribution of displacement electric field density along the drill pipe direction is shown in FIG. 7.

As may be seen from FIG. 7, the electric displacement field along the drill pipe to the underground basically remains constant at $0.5\times10^{-13}$ C/m² in the vertical interval, the electric displacement field is the weakest at the kick-off point, and rapidly increases in the horizontal interval.

Bringing the electric displacement density on the wellhead drill pipe D=0.5×10$^{-13}$ C/m$^2$, Cs-669 pF and S=0.126 m$^2$ in FIG. 7 into the Formula (2), and the induced voltage E2≈9.4 uV of the downhole excitation between the casing layer and the conductive layer may be obtained. The signal E1≈1.7 mV induced by ground interference is much smaller, and E2 may be ignored. Therefore, the induced voltage between the casing layer and the conductive layer is basically a pure interference signal.

Figure 8:
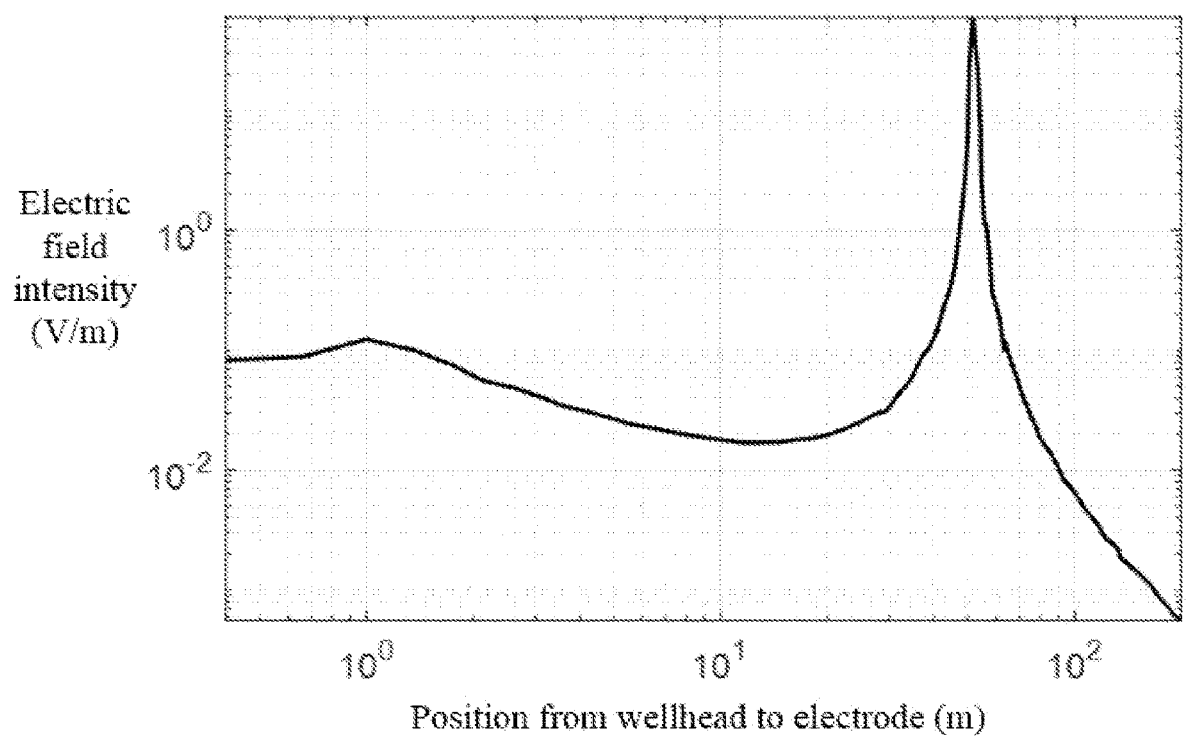
FIG. 8 is a schematic diagram of an electric field intensity distribution from a compensation electrode excitation wellhead to an electrode direction according to an embodiment of the present disclosure.

Step 3, applying a compensation excitation between the wellhead and the compensation electrode to force the induced voltage between the casing layer and the conductive layer to be minimum. When the distance from the compensation electrode to the wellhead is 51.8 m, the electric field intensity distribution along the direction of the compensation excitation is shown in FIG. 8.

It may be seen that the excitation electric field intensity of the compensation electrode is the strongest at the compensation electrode, and the measuring electrode is placed at the position of 50 m. The voltage between the wellhead and the electrode excited by the compensation electrode is the integral of the electric field intensity between the wellhead and the electrode, and V3≈9.96 V is calculated.

Figure 9:
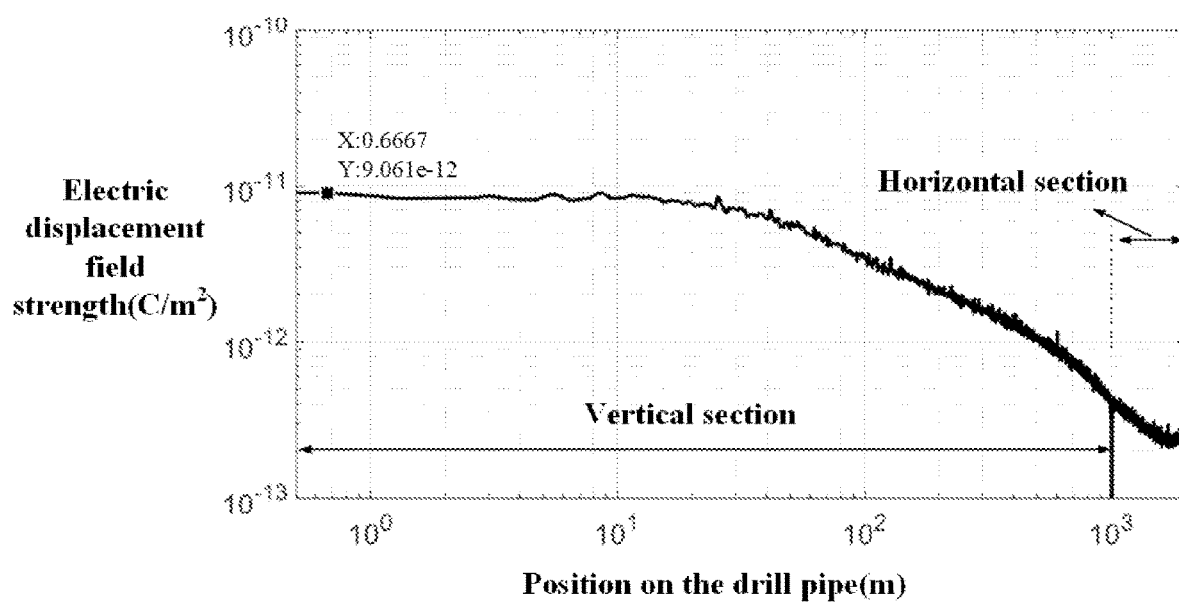
FIG. 9 is a schematic diagram of an electric displacement field distribution on a compensation electrode excitation drill pipe according to an embodiment of the present disclosure.

The displacement electric field density distribution along the drill pipe direction is shown in FIG. 9.

It may be seen that the electric displacement field intensity along the drill pipe excited by the compensation electrode is 9×10$^{-12}$ C/m$^2$ at the wellhead, which is consistent with the position of interference excitation here, and the compensation signal V3 obtained on the measuring electrode V3≈9.97 V, the interference signal V1≈9.98 V may be obtained by the calculation in the previous step, so the interference signal is cancelled by the compensation signal and the compensation effect is realized.

Figure 10:
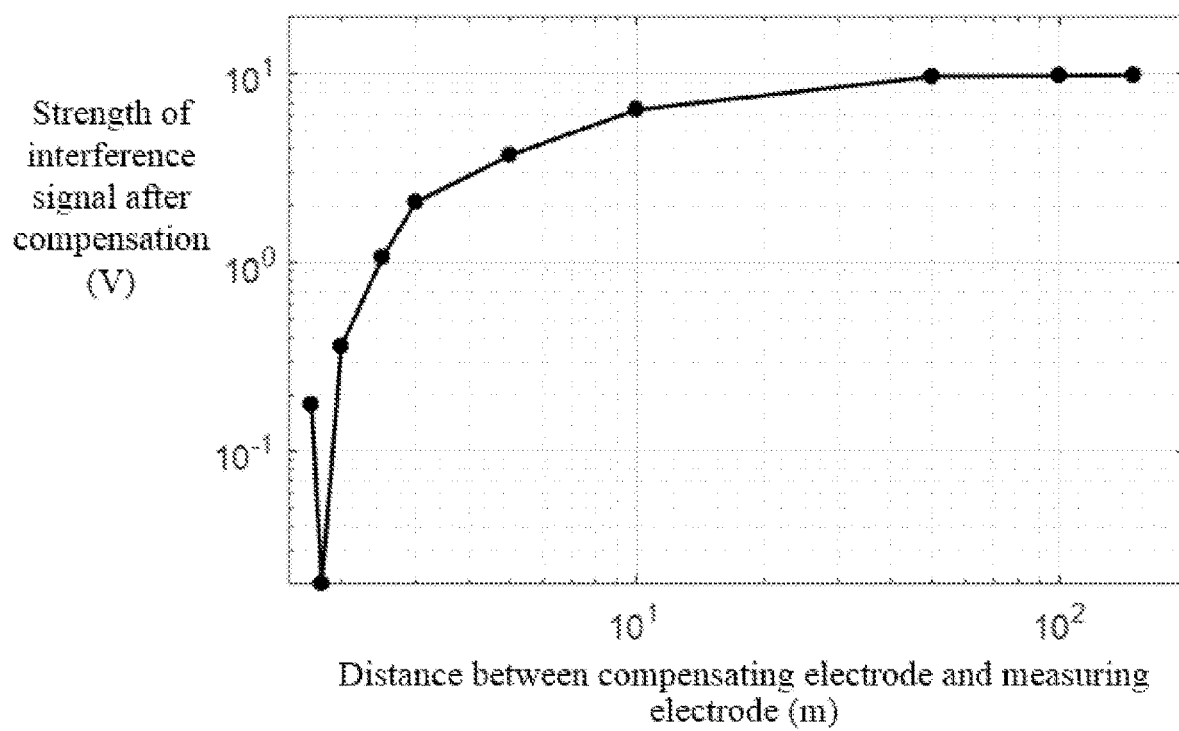
FIG. 10 is a schematic diagram of influences of a position of a compensation electrode on a compensation effect according to an embodiment of the present disclosure.

The position of the compensation electrode has an obvious influence on the compensation effect, and the compensation effect is different when the distance between the compensation electrode and the measuring electrode is different, as shown in FIG. 10.

It may be seen that an ideal compensation effect may be obtained after trying to find a suitable compensation point near the measuring electrode. At this time, the interference voltage of 9.98 V is compensated by 9.97 V, and only about 10 mV interference signal exists at this time, therefore the signal-to-noise ratio of the measuring signa is greatly improved.

The above is based on the effect under the condition of strong interference, and more ideal effect may be obtained when the interference is small. The transmission characteristics of the sensing front-end circuit is analyzed below.

Figure 11A:
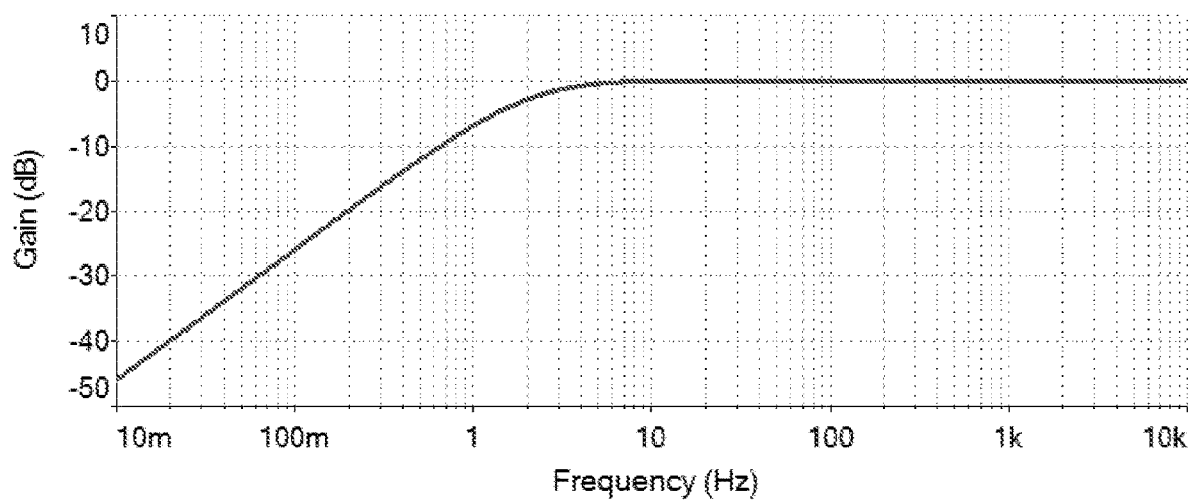
FIG. 11A is a schematic diagram of circuit amplitude-frequency characteristics detection according to an embodiment of the present disclosure.
Figure 11B:
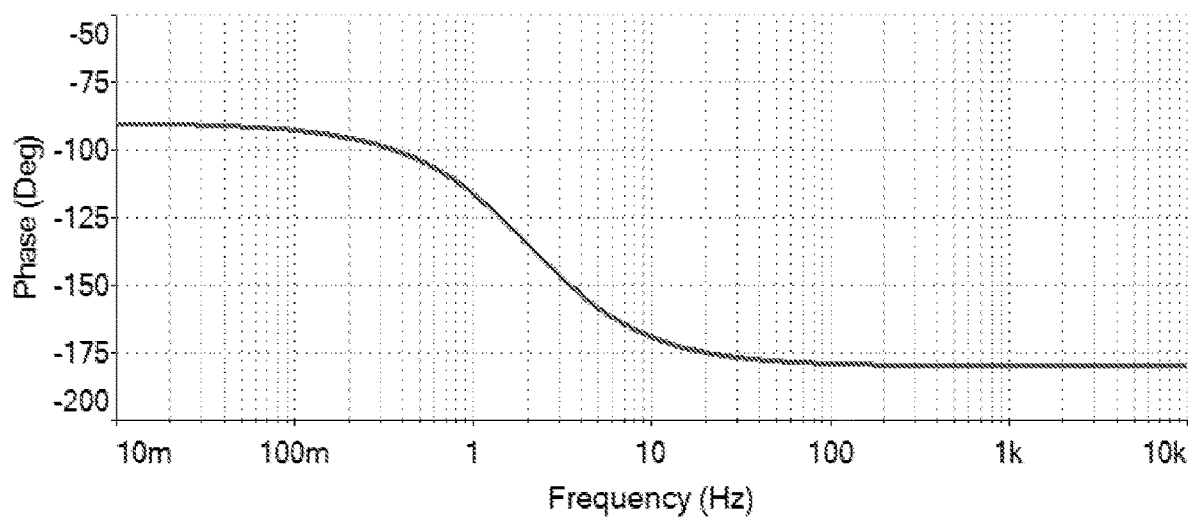
FIG. 11B is a schematic diagram of circuit phase-frequency characteristics detection according to an embodiment of the present disclosure.

According to the Formula (2), the capacitance between the conductive layer and the casing is about 669 pF. R=10 MΩ, C=0.1 uF, $R_f$=1 kΩ, $R_b$=10 kΩ, $C_f$=10 uF are selected. The transmission characteristics of the circuit are shown in FIG. 11A and FIG. 11B.

Usually, the frequency of well-to-ground transmission signal is about 10 Hz to ensure a sufficient transmission rate. As may be seen from FIG. 11A and FIG. 11B, in the effective frequency band, the signal has no attenuation and low transmission, and the high impedance is transformed into a low impedance, so it may be amplified at the next stage.

The above is only the preferred embodiment of the disclosure, but the protection scope of the disclosure is not limited to this. Any change or replacement that may be easily thought of by a person familiar with this technical field within the technical scope disclosed in the disclosure should be included in the protection scope of the disclosure. Therefore, the protection scope of the disclosure should be based on the protection scope of the claims.

What is claimed is:

1. A ground receiving front-end compensation system for intelligent guide drilling borehole-ground electromagnetic transmission, comprising a ground sensing module, a ground system, a measuring electrode and a compensation electrode;
   the ground system, the measuring electrode and the compensation electrode are all located at a same side of an underground wellhead, the measuring electrode is located at a first preset distance from the underground wellhead; and the compensation electrode is located at a second preset distance from the underground wellhead, and the second preset distance is greater than the first preset distance; the ground system is located between the underground wellhead and the measuring electrode;
   the ground sensing module is located below the underground wellhead;
   the ground system is used for measuring a voltage between the underground wellhead and the measuring electrode to obtain a measuring signal; an induction signal of the ground sensing module enters the ground system, and the ground system outputs a compensation signal based on the induction signal, and compensates the measuring signal based on the compensation signal;
   the ground system comprises a receiving module and a compensation module;
   the receiving module is respectively connected with the underground wellhead and the measuring electrode; the compensation module is respectively connected with the underground wellhead, the compensation electrode and the ground sensing module;
   the receiving module is used for measuring the voltage between the underground wellhead and the measuring electrode to obtain the measuring signal; and
   the compensation module is used for compensating the measuring signal;
   wherein the compensation module uses a signal of the ground sensing module as an error signal, and then sends a current to the compensation electrode to force the output signal of the ground sensing module to be minimum, so as to compensate a measuring interference signal.

2. The ground receiving front-end compensation system for intelligent guide drilling borehole-ground electromagnetic transmission according to claim 1, wherein the ground sensing module comprises a casing nipple and a front-end circuit;
   an outer layer of the casing nipple is coated with an insulating layer collar, and a conductive collar is embedded on the insulating layer collar; and
   the front-end circuit is electrically connected with the casing nipple.

3. The ground receiving front-end compensation system for intelligent guide drilling borehole-ground electromagnetic transmission according to claim 2, wherein the front-end circuit comprises a first operational amplifier, a second operational amplifier, a third operational amplifier, a resistor R, a capacitor C, a resistor $R_b$, a capacitor $C_f$ and a resistor $R_f$;
   a negative polarity end of the first operational amplifier is connected with the casing nipple and is connected with an output end of the first operational amplifier through the resistor R;

the output end of the first operational amplifier is connected with a positive polarity end of the second operational amplifier, and is connected with an output end of the second operational amplifier through the capacitor C;

the output end of the second operational amplifier is connected with the conductive collar and is connected with a negative polarity end of the third operational amplifier through the resistor $R_b$;

the resistor $R_f$ is connected in parallel with the capacitor $C_f$, with one end connected to the negative polarity end of the third operational amplifier after parallel connection, and an other end connected to an output end of the third operational amplifier and connected to a positive polarity end of the first operational amplifier;

a negative polarity end of the second operational amplifier and the positive polarity end of the third operational amplifier are both connected to a signal reference site;

an output of the second operational amplifier is used as an output of the ground sensing module.

4. The ground receiving front-end compensation system for intelligent guide drilling borehole-ground electromagnetic transmission according to claim 1, wherein the receiving module comprises a preamplifier, a data collector and a memory;

the preamplifier is used for amplifying the measuring signal;

the data collector collects the measuring signal; and the memory stores collected data.

5. The ground receiving front-end compensation system for intelligent guide drilling borehole-ground electromagnetic transmission according to claim 1, wherein the compensation module comprises a preamplifier, a PI compensator and a high-power current signal source;

the preamplifier is used for amplifying the ground sensing signal;

the PI compensator is used for obtaining a compensation current signal; and the high-power current signal source is used for outputting a compensation current.

\* \* \* \* \*